United States Patent [19]

Itaya et al.

[11] Patent Number: 4,897,511
[45] Date of Patent: Jan. 30, 1990

[54] METHOD OF DETECTION OF THE CONTACTING POSITION IN TOUCH PANEL SENSOR

[75] Inventors: Hisao Itaya; Kazuhiko Akebi; Minoru Okabe, all of Moriyama, Japan

[73] Assignee: Gunze Limited, Kyoto, Japan

[21] Appl. No.: 207,616

[22] Filed: Jun. 16, 1988

[30] Foreign Application Priority Data

Jun. 17, 1987 [JP] Japan .................. 62-153121

[51] Int. Cl.⁴ ............................................. G08C 21/00
[52] U.S. Cl. ...................................................... 128/18
[58] Field of Search .............................. 178/18, 19, 20

[56] References Cited

U.S. PATENT DOCUMENTS

| | | | |
|---|---|---|---|
| 3,005,050 | 10/1961 | Koenig | 178/20 |
| 3,662,105 | 5/1972 | Hurst et al. | 178/18 |
| 3,911,215 | 10/1975 | Hurst et al. | 178/18 |
| 4,220,815 | 9/1980 | Gibson et al. | 178/18 |
| 4,672,153 | 6/1987 | Kikuchi | 178/18 |

Primary Examiner—Stafford D. Schreyer
Attorney, Agent, or Firm—Wenderoth, Lind & Ponack

[57] ABSTRACT

In a method of detecting a contacting position using a touch panel, a pair of resistance layers formed on two substrates are opposed with a gap. At least one conduction member is provided on one edge of one of the resistance layers and another conduction member is provided on one edge of another resistance layer which extends in a direction perpendicular to the edge of said one of the resistance layer. A constant current source is connected to one conduction member so that when the resistance layers contact at a contacting position, a constant current flows from the conduction member of one of the resistance layers to the conduction member of said another resistance layer through the contacting point. Thus, the coordinate position of the contacting point can be detected by the voltage drops on the respective resistance layers.

11 Claims, 3 Drawing Sheets

METHOD OF DETECTION OF THE CONTACTING POSITION IN TOUCH PANEL SENSOR

BACKGROUND OF THE INVENTION

1. FIELD OF THE INVENTION

The present invention relates to a method of detecting contacting position in a touch panel sensor.

2. DESCRIPTION OF THE PRIOR ART

There have been widely used touch panel sensors which generate a signal representing two dimensional coordinate position by detecting a position of a panel depressed by means of a finger or pen. Since the touch panel formed by transparent members is attached to the surface of a display device, the touch panel is used as a simple picture data signal input device.

FIG. 1 shows an example of a conventional touch panel sensor 1 of a voltage dividing type using resistance layers.

Referring to FIG. 1, a pair of transparent insulation films 3, 3' of a generally rectangular shape, each having a transparent conducting layer 2, 2' of a rectangular shape with a predetermined surface resistance (referred to as a resistance layer 2, 2' hereinafter) formed on one surface of the film 3 (3') are so disposed and separated with a predetermined gap by a plurality of dot spacers 4 projected from on insulation film that the respective resistance layers 2 and 2' face each other.

Two conduction lines 5a and 5b are formed on the surface of the insulation film 3 so that the conduction lines 5a and 5b are electrically connected to opposite edges of the resistance layer 2. The conduction lines 5a and 5b are adapted to be applied with a DC voltage so that there is developed a potential gradient directed from the conduction line 5a to 5b. It is noted that the direction from the conduction line 5a and 5b is designated as the X direction. Similarly, two conduction lines 5a' and 5b' are formed on the surface of the insulation film 3' in such a manner that the conduction lines 5a' and 5b' are electrically connected to opposite edges of the resistance layer 2' so that another voltage gradient is developed on the resistance layer 2' in a Y direction which is perpendicular to the X direction of the voltage gradient developed on the resistance layer 2. 6a, 6b, 6a' and 6b' denote connection lines formed on the insulation films 3 and 3' for the conduction lines 5a, 5b, 5a' and 5b'.

In the touch panel mentioned above, when a portion of the outer surface of the touch panel is depressed by finger or pen, the insulation film is deformed and a portion of the resistance layer 2 contacts with the resistance layer 2'. If the finger or pen is removed from the insulation film, the portion of the resistance layer 2 is separated from the resistance layer 2'.

The conventional method of detecting the coordinate position (x and y) at the contact position P in the touch panel will be explained hereinafter.

In the conventional touch panel, DC voltage is applied to the resistance layer 2 first through the conducting lines 5a and 5b, and subsequently the DC voltage is applied to the resistance layer 2' through the conduction lines 5a' and 5b'.

When the touch panel is depressed at the position P and DC voltage Vx is applied to the resistance layer 2 through the conduction lines 5a and 5b, since a voltage $v_x$ at the point P of the resistance layer 2 is applied to the point P of the resistance layer 2', the X coordinate position of the position P in the X direction can be known by detecting the voltage between the conduction lines 5a' and 5b' of the resistance layer 2'. Subsequently when the DC voltage Vy is applied to the resistance layer 2' through the conduction lines 5a' and 5b', a voltage $v_y$ on the position P of the resistance layer 2' is applied to the position P of the resistance layer 2, the position P in the Y direction can be known by the voltage on the conduction lines 5a and 5b.

As mentioned above, in the conventional method of detecting the contact position of the touch panel, the DC voltages must be switched alternately to the resistance layers 2 and 2'. In the practical use, the voltage detection for the respective resistance layers 2 and 2' must be made within short periods, and therefore, there must be provided a high speed switch for rapidly switching the voltage to the respective resistance layers 2 and 2'.

Therefore, the conventional method for detecting the contact position using a touch panel requires a complicated and expensive arrangement, and moreover, accidents tends to occur.

SUMMARY OF THE INVENTION

Therefore, an essential object of the present invention is to provide a method of detecting the contacting position using a touch panel which is able to detect the contacting position at a high speed with a relatively simple circuit arrangement.

In order to accomplish the object of the present invention, in the method of detecting the contacting position using a touch panel, a pair of resistance layers formed on two substrates are opposed with a gap. At least one conduction member is provided on one edge of one of the resistance layers and another conduction member is provided on one edge of another resistance layer which extends in a direction perpendicular to the edge of said one of the resistance layer. A constant current source is connected to one conduction member so that when the resistance layers contact at a contacting position, a constant current flows from the conduction member of one of the resistance layers to the conduction member of the other resistance layer through the contacting point. Thus, the coordinate position of the contacting point can be detected by the voltage drops on the respective resistance layers.

According to the method of the present invention, when the two resistance layers contact by depression of the substrate of the touch panel, a constant current is delivered from the constant current source to flow from one conduction member of the one resistance layer to the one conduction member of the other resistance layer, which is perpendicular to the one conduction member of the one resistance layer through the contacting point. The coordinate position of the contacting point can be detected by the voltage drops of the respective resistance layers.

DETAILED DESCRIPTION OF THE PREFERRED EMBODIMENT

Figure 1:
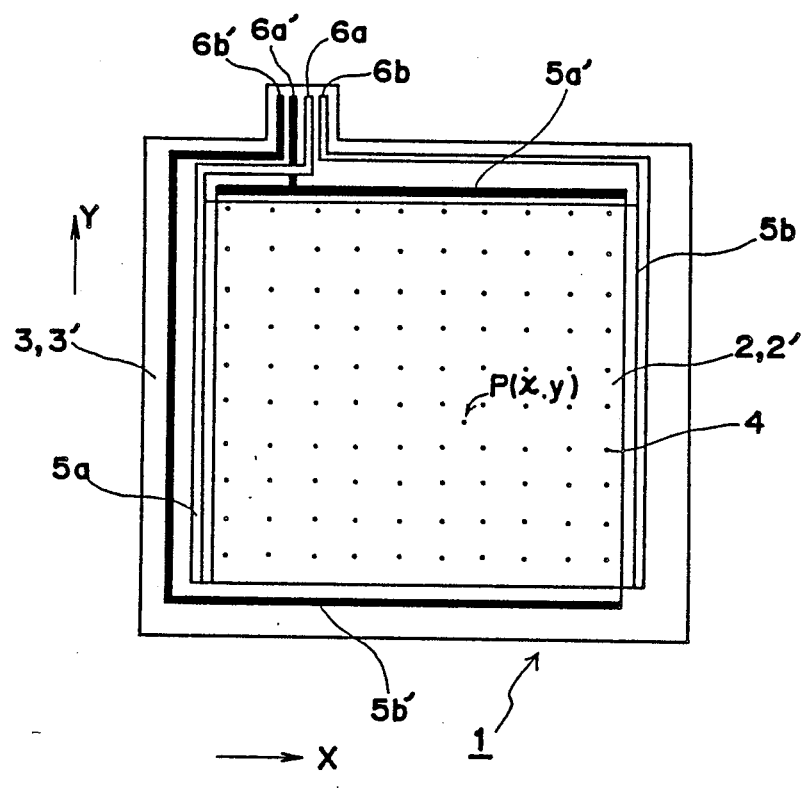
FIG. 1 is a plan view showing an example of a conventional touch panel.

Before the description proceeds, it is noted that like parts are designated by like reference numerals.

Figure 2:
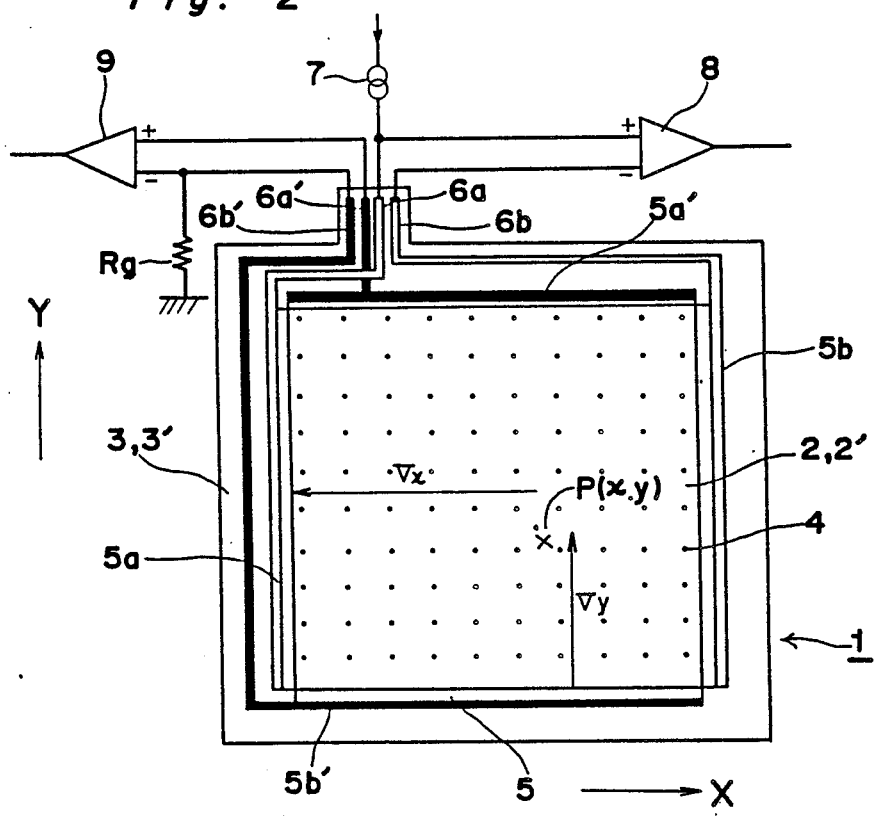
FIG. 2 is a schematic diagram showing an example of a method of detecting the contacting point according to the present invention.

The touch panel 1 itself shown in FIG. 2 is similar to that shown in FIG. 1, therefore details thereof are herein omitted. However, it is noted that as to the conduction members or conduction lines 5a, 5b, 5a' and 5b', one conduction line 5a of one resistance layer and one conduction line 5b' of the other resistance layer act as the terminals when the current flows from a constant current source and another conduction line 5b of one resistance layer and another conduction line 5a' of the other resistance layer act as the terminals for detecting the potential of the resistance layers.

Figure 3:
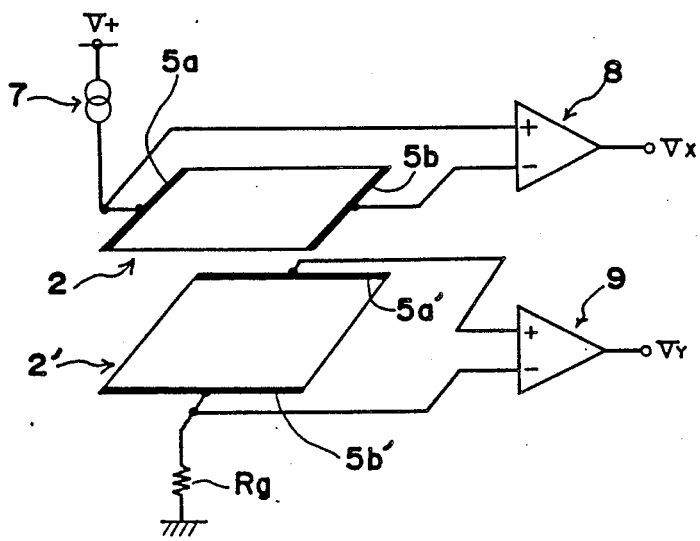
FIG. 3 is a perspective view showing the essential portion of the arrangement shown in FIG. 2, FIGS. 4 and 5 are schematic diagram showing operation of the arrangement shown in FIG. 2.

FIG. 3 shows the resistance layers 2 and 2' as separated so as to show the connections of the respective elements clearly.

Referring to FIG. 2, a constant current source 7 is connected between a + terminal of a power source and the connecting terminal 6a of the conducting line 5a of the resistance layer 2 and a resistor Rg is connected between the connecting terminal 6b' of the conducting line 5b' of the resistance layer 2' and the ground, whereby when the resistance layers 2 and 2' contact at the point P, the current entered from the conduction line 5a of the resistance layer 2 passes to the conduction line 5b' of the resistance layer 2' through the contact point P.

In order to detect the potential difference between the conducting lines 5a and 5b of the resistance layer 2, a subtracter 8 is connected between the connecting terminals 6a and 6b. In order to detect the potential difference between the conduction lines 5a' and 5b' of the resistance layer 2', another subtracter 9 is connected between the connecting terminals 6a' and 6b'. As the subtracters 8 and 9, differential amplifiers of an instrumentation amplifier type with amplification factor 1 are used. The input impedance of the subtracters 8 and 9 can be regarded as infinitive.

The operation of the coordinate detection using the touch panel mentioned above is explained hereinafter.

Figure 4:
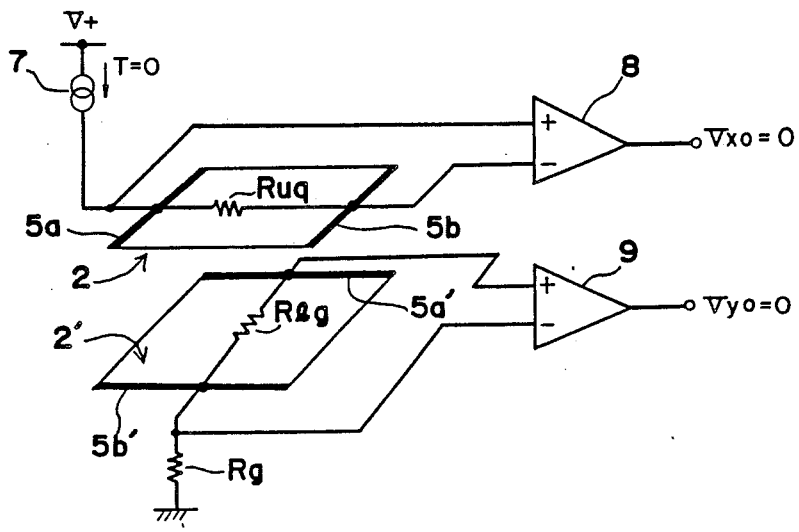
Figure 5:
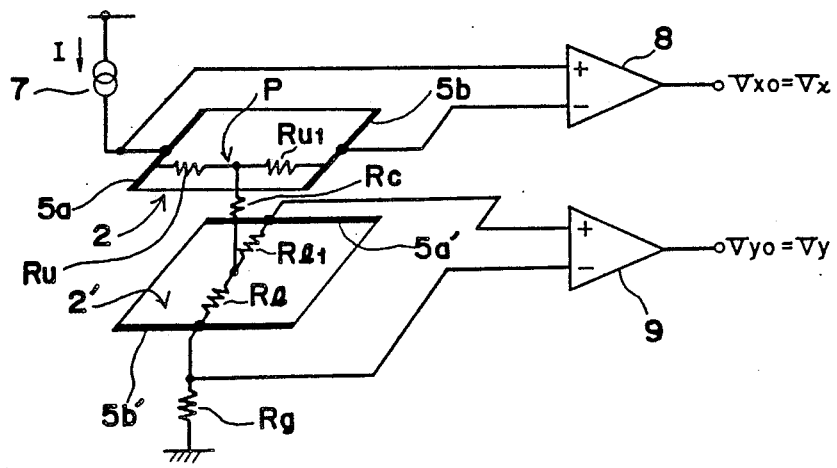

It is assumed that when both resistance layers 2 and 2' do not contact each other, as shown in FIG. 4, the equivalent resistance between the conduction lines 5a and 5b of the resistance layer 2 is Ruq and the equivalent resistance between the conduction lines 5a' and 5b' of the resistance layer 2' is Rlq. In this case, since the current does not flow to the resistance layers 2 and 2' from the constant current source 7, no potential difference is generated between the conduction lines 5a and 5b and 5a' and 5b' due to the voltage drop. Therefore, the potential of both input terminals of the respective subtracters 8 and 9 is the same and the output voltages Vxo and Vyo of the respective subtracters 8 and 9 are 0 volt.

When both resistance layers 2 and 2' are contacted at the coordinate position P, it is assumed that in the resistance layer 2, the equivalent resistance between the conduction line 5a and the contacting position P (the portion is represented as 5a - P) is Ru, the equivalent resistance between the position P and the conduction line 5b (P - 5b) is Ru1, also in the resistance layer 2', the equivalent resistance of the conduction line 5a' and the position P (5a'- P) is Rl1, and the equivalent resistance between the position P and the conduction line 5b' is Rl and the contact resistance between the resistance layers 2 and 2' at the position P is Rc. The current I from the constant current source 7 flows the paths 5a - P - 5b' which are represented by the equivalent resistances Ru, Rc and Rl and further flows to the ground through the external resistance Rg. By the current I, there are produced a voltage Vx across the portion 5a - P on the resistance layer 2 and another voltage Vy across the portion P - 5b' on the resistance layer 2'. In this case, since the input impedance of the subtracter 8 is infinitive and the current flowing the equivalent resistance Ru1 is 0 and Vx=Ru×I, the potential difference between the conduction lines 5a and 5b, that is the voltage Vab applied to both input terminals of the subtracter 8, is $$Vab = Ru \times I + Ru1 \times 0 = Ru \times I = Vx.$$

Therefore, the X component of the potential at the position P is substantially equal to the potential at the conduction line 5b.

Also, Vy=Rl×I and since the current flowing the equivalent resistance Rl1 is 0, the potential difference between the conduction lines 5a'- 5b' of the resistance layer 2', that is the potential difference Va'b' applied to both input terminals of the subtracter 9, is $$Va'b' = Rl \times I + Rl \times 0 = Rl \times I = Vy.$$

Therefore, the Y component of the potential at the position P is substantially equal to the potential of the conduction line 5a'.

As mentioned above, since the respective subtracters 8 and 9 receive the potential differences Vx and Vy, as the output voltages Vxo and Vyo of the subtracters 8 and 9, the potential differences Vx and Vy representing the position P can be obtained. The potential differences Vxo and Vyo correspond to the amount of the position P in the X direction and Y direction in the coordinate, the coordinate position of the contact position P can be determined by the output voltages of the subtracters 8 and 9.

It is noted that the constant current source 7 is so arranged that the current I of the constant current source 7 is kept constant so long as the entire resistance Rz=Ru+Rc+Rl+Rg in the path 5a - p - 5b' is less than a predetermined value, so that the current I is kept constant even if the contact resistance Rc is varied due to the change of the depressing force applied to the position P of the touch panel, therefore, no error occurs in the result of the measurement of the contact position P.

In the embodiment mentioned above, the conduction lines 5a and 5b of the resistance layer 2 and the conduction lines 5a' and 5b' of the resistance layer 2' are formed with a uniform width over the entire length of the respective edges of the resistance layers 2 and 2' as shown in FIG. 3, each of the conduction lines 5b and 5a' may be formed by a conductor contacting a part of the edge of the resistance layer 2 or 2' since the conduction lines 5b and 5a' are used as terminals for detecting the voltage.

As mentioned above, in the present invention, the respective X and Y components of the potential at the contact position P on the resistance layers 2 and 2' are substantially equal to the potential on the other conduction lines 5b and 5a' so that the coordinate position of the contact position P of the resistance layers 2 and 2' can be obtained by the X and Y components of the potential.

According to the method of the present invention, even if the area of the resistance layers is greater than the operation area available for the position detection, and the off-set resistance is great, the method of the present invention can be applied.

Although the preferred embodiment of the present invention is explained in the foregoing, there may be employed various modifications without departing from the spirit of the present invention. For examples, the present invention can be applied to all types of touch panels, generally referred to as resistance film voltage division type position sensors.

As the substrate of the touch panel, there may be exemplified an insulation film or sheet, a glass sheet, or a plastic sheet with a predetermined flexibility or resiliency, and thus there is no specific limitation as to the material of the substrate. Also, the substrate may be transparent or opaque.

As the resistance layer, although there is no specific limitation as to the material, there may be exemplified a metallic layer, a metal oxide layer formed on the substrate or a conduction paint coated on the substrate. As specific examples, there may be used a transparent electrically conductive film as the resistance layer, formed on a transparent plastic film by means of sputtering, vacuum evaporation, or ion plating, using a metal such as indium-tin oxide. The surface resistance of the resistance layer may be selected as desired so far as the surface resistance is uniform over the surface of the resistance layer. As a specific example, the surface resistance may be 5–800 ohm/square.

The gap of the two opposed resistance layers 2 and 2' may be selected such that both resistance layers are not contacted and they can be electrically insulated in the normal state or not operated condition. As examples, the distance of the gap may be selected to be 20 to 50 μm, however the distance of the gap is not limited to the value mentioned above.

Preferably, the resistance layers 2 and 2' may be separated by means of spacers as used in the embodiment mentioned above, the distance of the gap of the resistance layers being substantially equal to the height of the spacer. Although the shape of the spacer is not limited, there may be exemplified dot shapes, rib shapes or matrix shapes as the spacers.

The conduction lines or conduction members may be formed by various electrical conducting materials. Preferably as the conduction members, there may be exemplified aluminum, copper and silver, with a low resistance, lower than the resistance of the resistance layer. It is desirable that the difference of the resistance of the resistance layer and the conduction members is as large as possible.

Although a constant current source is used for supplying the constant current to the resistance layer, various arrangement may be used so far as the arrangement can supply a constant current to the resistance layers.

Also, in place of the subtracters, various devices may be used so far as the device can detect the potential difference or voltage difference.

It is advantageous that the method of the present invention does not require a switching device for alternately applying the voltage to the respective resistance layers, as used in the prior art, therefore there can be provided a method of detection of the contacting position in a touch panel with a relatively simple and inexpensive arrangement with few accidents.

Another advantage of the present invenion is that the contacting position is detected at the touch panel in a high speed since there is not used a switching device.

What is claimed is:

1. A method of detecting a contact position in a touch panel, comprising the steps of:
   providing first and second resistance layers opposite each other and separated by a predetermined gap, each said resistance layer supported by a respective substrate;
   providing a conduction member on at least one edge of said first resistance layer, and providing a conduction member on at least one edge of said second resistance layer extending in a direction perpendicular to the conduction member of said first resistance layer;
   connecting a constant current source to the conduction member of said first resistance layer;
   flowing a constant current from said constant current source when contact is made between said first and said second resistance layers at a contact point, through the conduction member of said first resistance layer, through said first resistance layer, and through said contact point to said second resistance layer; and
   detecting the coordinate position of said contact point by detecting a voltage drop generated by said constant current one each of said respective resistance layers.

2. The method of detecting a contact position in a touch panel as set forth in claim 1, wherein:
   said step of providing a conduction member on at least one edge of said first resistance layer and providing a conduction member on at least one edge of said second resistance layer comprises providing conduction members on opposite edges of said first resistance layer and providing conduction members on opposite edges of said second resistance layer in a direction perpendicular to the conduction members of said first resistance layer.

3. The method of detecting a contact position in a touch panel as set forth in claim 1 wherein:
   said step of detecting the coordinate position of said contact point by detecting the voltage drop generated on each of said respective resistance layers comprises using at least one subtracter to detect said voltage drop.

4. The method of detecting a contact position in a touch panel as set forth in claim 3, wherein:
   said subtracter comprises an operatioinal amplifier having a predetermined amplification factor.

5. The method of detecting a contact position in a touch panel as set forth in claim 1, wherein:
   said step of providing said first and second resistance layers comprises sputtering a metal material onto each said substrate, each said substrate comprising a transparent plastic resin sheet.

6. The method of detecting a contact position in a touch panel as set forth in claim 5, wherein:
   said step of providing said first and second resistance layers further comprises said first and second resistance layers with a predetermined gap by means of a plurality of dot spacers disposed between said first and second resistance layers and providing said first and second resistance layers with a resistance of 5 to 800 ohms per square area.

7. The method of detecting a contact position in a touch panel as set forth in claim 1, wherein:

said step of providing said first and second resistance layers opposite each other and separated by a predetermined gap comprises providing a plurality of dot like spacers between said first and second resistance layers to form said predetermined gap.

8. The method of detecting a contact position in a touch panel as set forth in claim 7, wherein:

said step of providing said first and second resistance layers further comprises providing said plurality of dot like spacers so as to form said predetermined gap in a range of 20 to 50 μ.

9. The method of detecting a contact position in touch panel as set forth in claim 1, wherein:

said step of connecting said constant current source to the conduction member of said first resistance layer comprises connecting said constant current source directly to said conduction member.

10. The method of detecting a contact position in a touch panel as set forth in claim 9, and further comprising the step of:

connecting the conduction member of said second resistance layer to ground through an external resistor.

11. The method of detecting a contact position in a touch panel as set forth in claim 1, wherein said step of detecting the coordinate position of said contact position comprises detecting a voltage drop generated on each of said respective resistance layers directly proportional to the distance of said contact position from said respective conduction members of said first and second resistance layers.

* * * * *